US009899862B2

United States Patent
Isotalo et al.

(10) Patent No.: US 9,899,862 B2
(45) Date of Patent: Feb. 20, 2018

(54) WIRELESS CHARGER

(71) Applicant: Nokia Technologies Oy, Espoo (FI)

(72) Inventors: Hannu Isotalo, Piikkiö (FI); Janne Sovela, Turku (FI)

(73) Assignee: PROVENANCE ASSET GROUP LLC, Essex, CT (US)

( * ) Notice: Subject to any disclaimer, the term of this patent is extended or adjusted under 35 U.S.C. 154(b) by 173 days.

(21) Appl. No.: 14/783,418

(22) PCT Filed: Apr. 12, 2013

(86) PCT No.: PCT/FI2013/050403
§ 371 (c)(1),
(2) Date: Oct. 8, 2015

(87) PCT Pub. No.: WO2014/167171
PCT Pub. Date: Oct. 16, 2014

(65) Prior Publication Data
US 2016/0072335 A1    Mar. 10, 2016

(51) Int. Cl.
*H02J 7/00*   (2006.01)
*H02J 7/02*   (2016.01)
*H02J 50/80*  (2016.01)

(52) U.S. Cl.
CPC ............... *H02J 7/025* (2013.01); *H02J 50/80* (2016.02); *H02J 2007/0062* (2013.01)

(58) Field of Classification Search
CPC ..... H02J 7/025; H02J 50/80; H02J 2007/0062
(Continued)

(56) References Cited

U.S. PATENT DOCUMENTS

2008/0061733 A1   3/2008 Toya
2012/0249084 A1   10/2012 Vilhauer et al.
(Continued)

FOREIGN PATENT DOCUMENTS

CA    2794703 A1    1/2013
CN   101604278     12/2009
(Continued)

OTHER PUBLICATIONS

Office action received for corresponding Chinese Patent Application No. 201380076561.3, dated Apr. 12, 2017, 7 pages of office action and no pages of office action translation available.
"5-V, Qi Compliant Wireless Power Transmitter Manager", Texas Instruments, bq500211, Jun. 2012, 27 pages.
Extended European Search Report received for corresponding European Patent Application No. 13881598.0, dated Sep. 14, 2016, 7 pages.
"USB As a Power Source", girr.org, Retrieved on Oct. 26, 2016, Webpage available at : http://www.girr.org/mac_stuff/usb_stuff.html.
(Continued)

*Primary Examiner* — Edward Tso
*Assistant Examiner* — Aaron Piggush
(74) *Attorney, Agent, or Firm* — Banner & Witcoff, Ltd.

(57) ABSTRACT

The invention relates to testing charging capability a power interface of a device, for example, a USB port (12). A method for testing charging capability comprises receiving voltage at a power supply interface of a wireless charging transmitter (10), providing a load (11) between the power supply interface and ground for a duration by a power supply testing circuit of the wireless charging transmitter (10) comprising a charging area (24), measuring a power supply voltage between the power supply interface and the ground over the load (11), and determining a charging capability of the power supply interface on the basis of the measured power supply voltage. The invention further relates to an apparatus and a computer program product.

18 Claims, 2 Drawing Sheets

(58) Field of Classification Search
USPC .................................. 320/108, 134, 162
See application file for complete search history.

(56) References Cited

U.S. PATENT DOCUMENTS

2013/0007473 A1* 1/2013 van der Lee ........... G06F 1/206
 713/300
2013/0151825 A1* 6/2013 Huynh .................... H02M 1/08
 713/1

FOREIGN PATENT DOCUMENTS

| CN | 101604278 A | 12/2009 |
|----|-------------|---------|
| CN | 101796703 A | 8/2010 |
| JP | 2008-048482 A | 2/2008 |
| JP | 2010-104103 A | 5/2010 |
| WO | 2009/032058 A2 | 3/2009 |
| WO | 2013015206 | 1/2013 |

OTHER PUBLICATIONS

Office action received for corresponding Japanese Patent Application No. 2016-507017, dated Oct. 25, 2016, 3 pages of office action and 3 pages of office action translation available.
International Search Report and Written Opinion received for corresponding Patent Cooperation Treaty Application No. PCT/FI2013/050403 , dated Jan. 10, 2014, 11 pages.
Final Office action received for corresponding Japanese Patent Application No. 2016-507017, dated Mar. 29, 2017, 3 pages of office action and 3 pages of office action translation available.
Nov. 3, 2017—(CN) Office Action—App 201380076561.3 including rejection(s) based on CA2794703 and CN101604278.

* cited by examiner

WIRELESS CHARGER

RELATED APPLICATION

This application was originally filed as PCT Application No. PCT/FI2013/050403 filed Apr. 12, 2013.

BACKGROUND

Electromagnetic induction has been known for a long time and it has been used in many applications. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from circuit to another via inductively coupled coils. A primary coil transforms an alternating current into a varying magnetic flux, which is arranged to flow through the secondary coil. The varying magnetic flux then induces an alternating voltage over the secondary coil. The proportion of the input and output voltage can be adjusted by the number of turns in the primary and secondary coils.

Wireless charging is an application where electromagnetic induction is used to transfer energy over air. A wireless charging system comprises a charger device i.e. a power transmitter with a primary coil, and a device to be charged i.e. a power receiver with a secondary coil. The current in the charger device is transferred to the charged device through these electromagnetically coupled coils, and the induced current may be further processed and used to charge the battery of the charged device. Energy is transmitted through inductive coupling from the charger device to the charged device, which may use that energy to charge batteries or as direct power.

A trend in today's charger devices, e.g. in charger devices of portable electronics, is a wireless inductive charger device using an Universal Serial Bus (USB) type wall charger or USB port of some other device, for example, some other portable device, as a power source. These charger devices are suitable to be used in various surroundings, with various devices comprising at least one USB port and without a need to find an electric wall socket for an electric cable of the charger and without a need to connect portable electronics to the charger by a wire. However, some wireless charger devices suitable for wireless charging need 5 W minimum level as input power in order to supply enough power for a device to be charged to ensure effective charging capacity.

SUMMARY

The present application relates generally to wireless USB operated charging (WLC) transmitters (TX) i.e. charging devices using a USB port as power supply and having a testing capability for testing supplied power of the USB port. In particular, the invention relates to wireless USB operated charging devices having testing capability for testing supplied power of the USB port without a power receiver on a charging area of the charging device or before starting to charge a power receiver on a charging area of the charging device.

Various aspects of the invention include an apparatus, a method and a computer program product. Various embodiments of the invention are disclosed in the dependent claims.

The present application relates to testing charging capability a power interface of a device, for example, a USB port.

According to a first aspect of the invention, there is provided a method, comprising receiving voltage at a power supply interface of a wireless charging transmitter, providing a load between the power supply interface and ground for a duration by a power supply testing circuit of the wireless charging transmitter comprising a charging area, measuring a power supply voltage between the power supply interface and the ground over the load, and determining a charging capability of the power supply interface on the basis of the measured power supply voltage.

According to an embodiment, the method further comprises indicating the determined charging capability. According to an embodiment, the method further comprises transmitting energy inductively to a power receiver on the charging area if the charging capability is determined to be an active charging capability. According to an embodiment, the received voltage is +5V. According to an embodiment, the load is resistive and the resistance of the load is 5Ω. According to an embodiment, the duration is 30 ms. According to an embodiment, the method further comprises transmitting a message indicative of the charging capability via a wireless communication interface. According to an embodiment, the power supply interface comprises a voltage bus (VBUS) of a universal serial bus (USB) interface. According to an embodiment, measuring the power supply voltage is done prior to power transmission.

According to a second aspect of the invention, there is provided an apparatus comprising at least a wireless charging coil for transmitting inductive energy by inductive coupling and comprising a charging area and a power supply testing circuit for detecting a charging capability of the power supply interface, a WLC controller circuit and a power transmitting circuit for transmitting power to the wireless charging coil, wherein the power supply testing circuit is arranged to receive voltage to at a power supply interface and to provide a load between the power supply interface and ground for a duration and to measure a power supply voltage between the power supply interface and the ground over the load and to determine a charging capability of the power supply interface on the basis of the measured power supply voltage.

According to an embodiment, the apparatus further comprises means for indicating the determined charging capability. According to an embodiment, the WLC controller circuit is arranged to activate the power transmitting circuit for transmitting power to the wireless charging coil if the charging capability is determined to be an active charging capability and if a power receiver is on the charging area. According to an embodiment, the received voltage is +5V. According to an embodiment, the load is resistive and the resistance of the load is 5Ω. According to an embodiment, the duration is 30 ms. According to an embodiment, the apparatus further comprises means for transmitting a message indicative of the charging capability via a wireless communication interface. According to an embodiment, wherein the power supply interface comprises a voltage bus (VBUS) of a universal serial bus (USB) interface. According to an embodiment, the power supply voltage is done prior to power transmission.

According to a third aspect of the invention, there is provided a computer program product embodied on a non-transitory computer readable medium, comprising computer program code configured to, when executed on at least one processor, cause an apparatus to receive voltage at a power supply interface of a wireless charging transmitter, provide a load between the power supply interface and ground for a duration by a power supply testing circuit of the wireless charging transmitter comprising a charging area, measure a power supply voltage between the power supply interface and the ground over the load; and determine a charging capability of the power supply interface on the basis of the measured power supply voltage.

According to a fourth aspect of the invention, there is provided an apparatus, comprising means for receiving voltage at a power supply interface of a wireless charging transmitter, means for providing a load between the power supply interface and ground for a duration by a power supply testing circuit of the wireless charging transmitter comprising a charging area, means for measuring a power supply voltage between the power supply interface and the ground/over the load, and means for determining a charging capability of the power supply interface on the basis of the measured power supply voltage.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
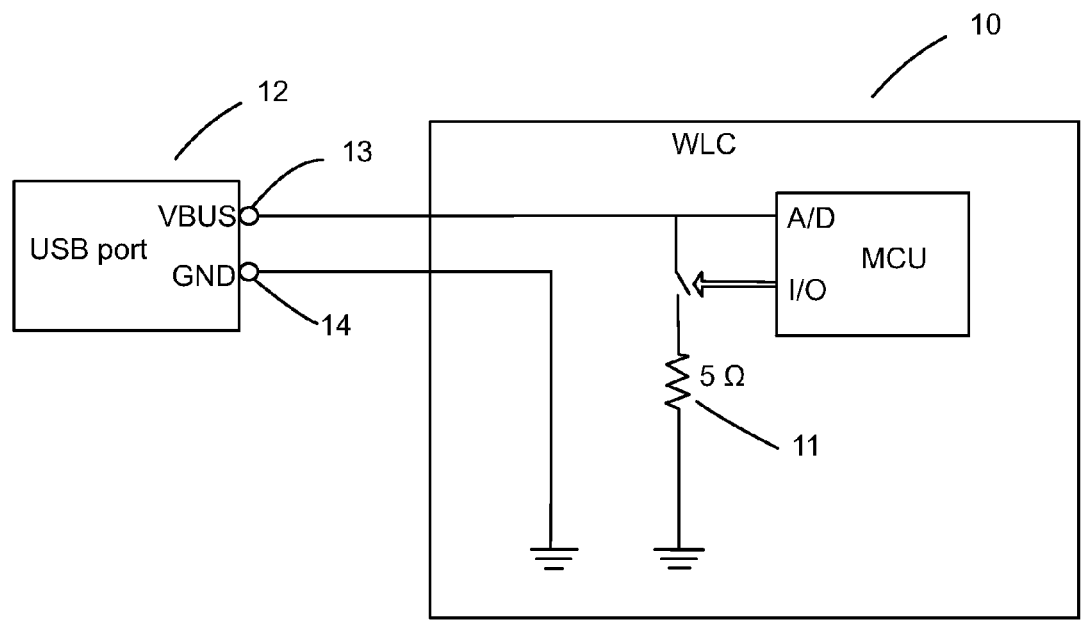
FIG. 1 shows a USB testing circuit structure of a wireless inductive charging device according to an example embodiment.

Wireless charging is a convenient way of charging a mobile device. In order to make a wireless charging transmitter to a primary charger it should be handy to use. One way of making it easier is to use a power interface of another device to supply power to the wireless charging transmitter. A good example of such power interface is USB, because USB ports are available almost in every electronic appliance. When USB ports are used for power supply, there is no need for an AC-DC-adapter. Using of USB ports for charging is also advantageous, because AC-DC-adapter varies between countries, whereas USB remains the same.

Wireless charging (WLC) transmitters (TX) i.e. a WLC transmitting devices that use a USB port as power supply may require at least 5 W power supply as its input to provide full charging capability for a wireless charging receiver i.e. a WLC receiver of a portable device, for example, a mobile phone. However, all USB ports may not be able to provide such power at the moment of charging or ever. Charging capacity of an USB port may depend, for example, on the number of other devices or the amount of current drawn by the other devices connected to other USB ports of the same device.

A Standard Downstream USB Port (SDP) which is the most common USB port type in electronic appliances is specified up to 2.5 W (500 mA @ 5V) power only. Typically electronic devices have several SDP USB ports and USB VBUS voltage is supplied to multiple SDPs parallel from a common +5V rail. When most of the ports are not being loaded or are loaded only with a small load (mouse, keypad etc.) one of the ports can supply the needed amount of power (≥5 W) for the WLC transmitter. However, if the capability of supplying power of a USB port is inadequate prior to starting the power transfer it can cause an unexpected collapse of the voltage meaning interrupt on charging WLC receiver with the USB powered wireless charger.

A wireless charging (WLC) transmitter may test power supply ability of a USB port during charging i.e. when a power receiver is attached to an interface surface of the power transmitter. The term "interface surface" here refers to a charging area, on which the WLC transmitter transfers inductive energy to a WLC receiver. These methods may monitor/measure the input voltage of a USB power supply during charging and power delivery capabilities of the USB port may be indicated to the user, for example, by a LED during the charging process. However, because these methods monitor the input voltage from USB power supply during charging by using the WLC receiver as a WLC load, the user cannot know prior to charging if the USB port is suitable for charging. In addition, the measured input voltage value depends on the size/amount of the WLC load i.e. WLC receiver and the WLC transmitting device cannot control the amount of WLC load and therefore the WLC transmitting device cannot provide reliable capability indications to the user in the beginning of charging. Also, the WLC receiver may start charging with low power (small WLC load) and increase the load afterwards (bigger WLC load), which may make these testing methods or testing results unreliable. It is advantageous to know immediately at the time of plugging the WLC transmitter to the USB socket/port or at the latest when putting the WLC received on the interface surface whether the WLC transmitter has full, limited, or no charging capability so that the user may change port or disconnect devices from other USB ports in order to release enough power for WLC charger.

In the following, several embodiments of the invention will be described in the context of an apparatus, for example, a USB powered wireless charging device, transmitting inductive energy for a device, for example, a mobile device, by plugging the mobile apparatus to the USB port of an electronic appliance. It is to be noted, however, that the invention is not limited to charging devices only. In fact, the different embodiments may have applications widely in any environment where an apparatus is suitable to use a USB port as input power supply. In embodiments of the invention, the USB powered inductive energy charger may be used to transfer inductive energy to a device wirelessly and therefore the USB powered inductive energy charger, as described throughout the specification, may be generally referred to as a WLC transmitter. The WLC transmitter comprising a primary WLC coil is suitable to transmit inductive energy by inductive coupling or magnetic resonance, i.e., an inductive energy link to a device that is a power receiver comprising a secondary WLC coil. The device may be, for example, a mobile phone, a mobile computer, a mobile collaboration device, a mobile internet device, a smart phone, a tablet computer, a tablet personal computer (PC), a personal digital assistant, a handheld game console, a portable media player, a digital still camera (DSC), a digital video camera (DVC or digital camcorder), a pager, or a personal navigation device (PND). The power transmitter may also be implemented in objects suitable to charge such devices, e.g. a hand bag, pillow, table, cloth etc. The electronic appliance comprising at least one USB port may be, for example, a computer, a laptop, a video game, a printer, a scanner, a copier, a multifunction machine, a tablet computer, a TV, a DVD player or a Blue-ray player.

Instead of a during-charging-testing method, the embodiments of the invention use a prior-to-charging-USB-port-testing method of USB ports prior to charging by using a WLC transmitter. In this prior-to-charging-USB-port-testing method according to the invention the WLC transmitter is connected to a USB port by a USB connector and +5V is applied/provided to Voltage Supply Line of USB (VBUS). The WLC transmitter connects a load (e.g. a resistive load of 5 ohms in a test circuit of the WLC transmitter) between the VBUS and ground for a certain duration, for example, 30 ms. The voltage over the load i.e. the VBUS voltage is monitored/measured during the testing method i.e. the above mentioned certain duration. In general, the load may be any component that allows measuring the supply voltage, e.g., an active current drain of 1 A. On the base of the measured voltage the WLC transmitter can determine a charging capability of the USB port i.e. whether the USB port is capable of supplying enough power for charging or not. The threshold voltage value for an active charging capability may be ≥4.5V i.e. the VBUS voltage is 4.5V or greater when the 5 Ω load of the WLC transmitter is connected across the VBUS and ground for the certain duration. If the USB port is in the active charging capability the WLC transmitter enters to a normal wireless charging operation. Also, active charging capability may be indicated, for example, by a visual or audio signal. And when the VBUS voltage is below 4.5V the USB port is in an inactive charging capability and the USB port is not capable of supplying enough power for charging. An error may be indicated, for example, by a different visual or audio signal. In addition, it is possible to define threshold values for limited charging capability and to indicate it. For example, when the measured voltage value is below the threshold value for the active charging state, but above another threshold (e.g. the voltage is between 3V and 4,5V), the WLC transmitter may determine that the USB port has limited charging capability. A limited charging capability may result in a longer charging time, and it may be beneficial to the user to know this. In addition the VBUS voltage may be constantly monitored during the prior-to-charging-USB-port-testing (duration of the test may be the above mentioned 30 ms) and if the VBUS voltage collapses below 4.25V, the USB connector of the WLC transmitter may be immediately electronically disconnected from the USB port in order to prevent the VBUS of the USB port from collapsing.

In addition to indicating the charging capability by visual or audio signal by the transmitter itself, the transmitter may provide the charging capability information to the charged device. For example, if there is a power receiving device on the interface surface of the transmitter at the time of plugging the WLC transmitter to an USB power supply, or when the transmitter detects placement of a charged device on the interface surface, the transmitter may send a status message indicative of its charging capability to the charged device. Such status message may be sent by, e.g., short-range wireless communication such as NFC (Near-Field Communication) or Bluetooth, or by the power transfer interface itself. The charged device may then indicate the charging capability to the user by its user interface. This may be beneficial, if a user wishes to avoid inefficient charging and use alternative charging methods, when the USB powered wireless charger does not have full charging capability.

In the prior-to-charging-USB-port-testing method, it is suitable to use as a USB connector, for example, a Standard Downstream Port (SDP) or a low power Dedicated Charging Port (DCP) i.e. an AC wall charger having USB connector as a USB connector of the WLC transmitter. The SDP has a power source capacity beyond 500 mA and the low power DCP has a maximum current below 1 A (5 W).

The prior-to-charging-USB-port-testing method provides increased user experience for users of USB powered wireless charging transmitters, because there is no unnecessary rejection of SDP ports that are actually capable of providing more current than standard 500 mA and also Low power DCPs are recognized. In addition, this testing method can be done when plugging the WLC transmitter to a USB port and/or when placing a WLC receiver on the charging area of the WLC transmitter.

In general, the prior to charging USB ports testing circuit of a WLC transmitter may be used to detect VBUS voltage and on the basis of detected VBUS voltage the WLC transmitter may determine the charging capability of the USB port, indicate the charging capability and further start the charging.

Figure 2:
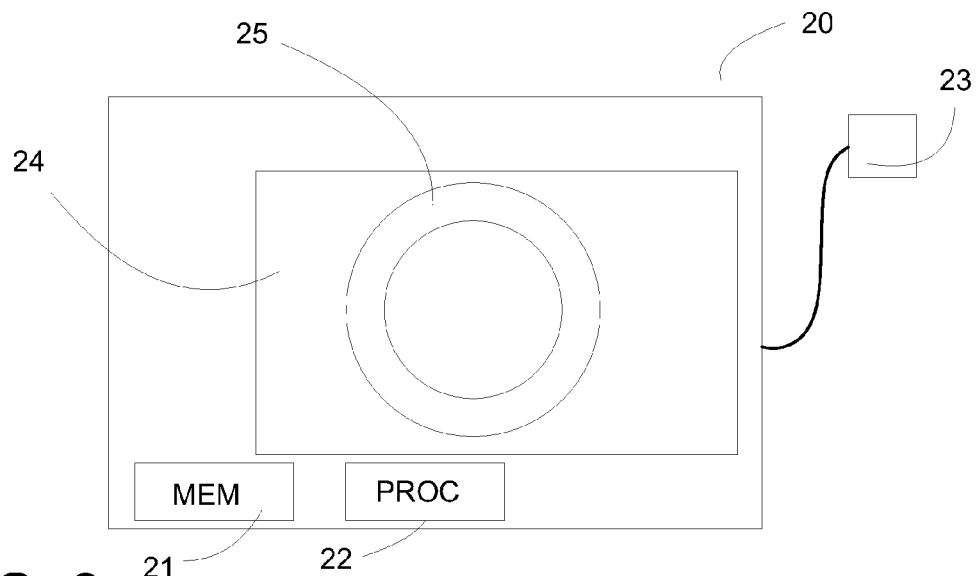
FIG. 2 shows a USB operated power transmitter apparatus according to an example embodiment.
Figure 3:
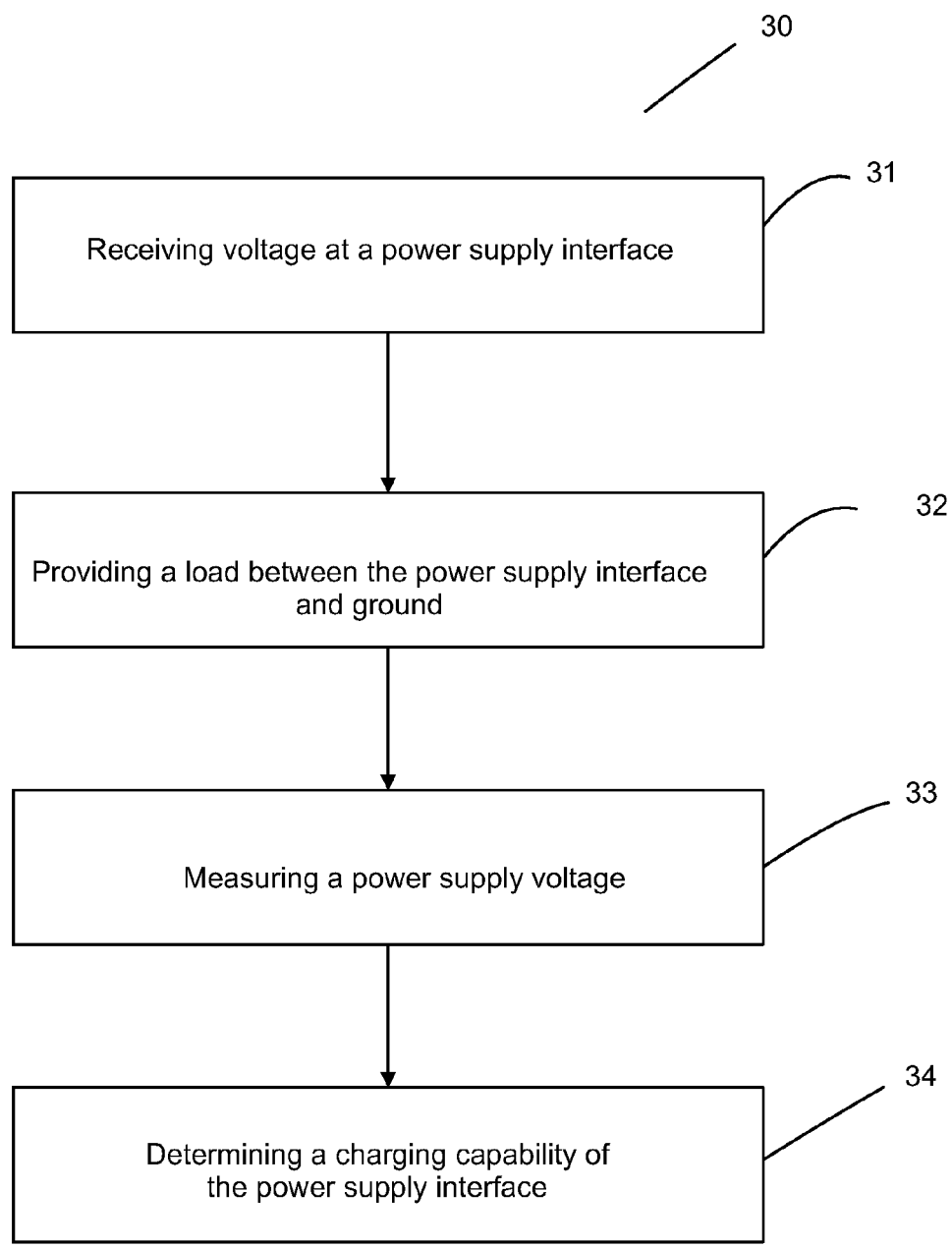
FIG. 3 shows a flow chart of USB testing and charging method according to an example embodiment.

An example embodiment of the present invention and its potential advantages are understood by referring to FIGS. 1 through 3 of the drawings.

FIG. 1 shows an example of a USB port testing circuitry implemented as an additional function for a WLC transmitter 10. The USB port testing circuitry comprises a resistive load 11. The load 11 may be, for example, 5 ohms. The load 11 is arranged to be connected between a VBUS 13 and GND 14, by a USB connector (not shown) of the WLC transmitter 10 for a certain duration while +5V is applied to the VBUS 13 by the USB port 12. The voltage signal may also be smaller or higher than +5V. The certain duration may be, for example, 15-45 ms, such as 30 ms. The voltage over the load 11 i.e. the VBUS voltage is detected during the certain duration. On the basis of the measured voltage the WLC transmitter 10 may determine whether the USB port 12 satisfies an active charging capability. If the USB port 12 satisfies the active charging capability, the WLC transmitter 10 enters to a normal wireless charging operation. Also, the active charging capability may be indicated for a user prior to charging. If the USB port 12 does not satisfy the active charging capability and the USB port 12 is not capable of supplying enough power for charging, the WLC transmitter 10 may indicate an error for the user and the WLC transmitter 10 does not move to the normal charging state. However, it is also possible that the WLC transmitter 10 repeats the USB port testing after a predetermined time.

FIG. 2 shows an example of a USB operated power transmitter apparatus 20. The apparatus 20 comprises a memory 21 configured to store computer program code used for operating USB port testing method prior to charging. The apparatus 20 comprises a processor 22 that executes the program code to perform the apparatus' functionality. The apparatus 20 also comprises a USB cable 23 as powering means. The USB cable 23 is configured to be connected to some USB port device i.e. a device comprising at least one USB port for power supply. In addition, the apparatus 20 comprises a charging area 24 for a power receiver. There is a WLC primary coil 25, a wireless charging coil, which is suitable for charging power receivers comprising at least one WLC secondary coil for receiving the energy wirelessly when power receivers are arranged/attached onto the charging area 24. However, it is also possible that there is more than one WLC primary coils in addition to the coil 25. The apparatus 20 may further have one or more LEDs 26 for indicating the user about the capability of a USB port, for example, by one or more LEDs may be used for indicating to the user one of the following charging capabilities of a USB port: an inactive charging capability i.e. the USB port is not capable of charging, the USB port is in limited charging mode or an active charging capability i.e. the USB port has full charging capability. The apparatus 20 may further have one or more physical buttons or one or more touch-screen buttons. The apparatus 20 may comprise a keypad being provided either on the display as a touch-screen keypad or on the housing of the apparatus as a physical keypad (not shown). The apparatus 20 may further comprise a microphone and a loudspeaker (not shown) to receive and to transmit audio. The apparatus 20 may also comprise a communication interface (not shown) configured to connect the apparatus 20 to another device, via wireless and/or wired network, and to receive and/or transmit data by said wireless/wired network. The apparatus 20 may further comprise a display and an input/output element to provide e.g. user interface views to the display or messages for the user about charging such as charging is ready or to indicate the user about charging capabilities of a USB port. These charging capabilities are mentioned in context with LEDs 26. Further the apparatus 20 may comprise a loudspeaker to provide audio messages for the user about charging, such as charging is ready or to indicate the user about charging capabilities of a USB port. These charging capabilities are mentioned in context with LEDs 26. The apparatus 20 may further comprise a WLC controller circuit (not shown) that is arranged to activate a power transmitting circuit for transmitting power to the wireless charging coil 25 of the apparatus 20 in response to determining that the charging capability is an active charging capability.

FIG. 3 shows a flow chart of a USB port testing method 30 according to an embodiment. In step 31 a USB port testing circuit receives voltage from a VBUS of an USB port. In step 32 the USB port testing circuit provides a resistive load across the VBUS and ground for a certain duration. In step 33 the USB port testing circuit measures a VBUS voltage between the VBUS and the ground i.e. over the resistive load. In step 34 the USB port testing circuit determines a charging capability of the USB port on the basis the measured VBUS voltage.

The power receiver i.e. WLC receiver may be, for example, a mobile phone, a smart phone, a tablet computer, a game console or any other portable device that is suitable to be inductively charged by a power transmitter i.e. WLC charger.

The term "on a charging area" here refers to a situation where a power receiver is on the charging area or so close to the charging area that the WLC power transmitter is suitable to move the power to the power receiver inductively.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

It is obvious that the present invention is not limited solely to the above-presented embodiments, but it can be modified within the scope of the appended claims.

The invention claimed is:

1. A method, comprising:
   receiving voltage at a power supply interface of a wireless charging transmitter comprising a charging area,
   providing a load between the power supply interface and ground for a duration by a power supply testing circuit of the wireless charging transmitter,
   measuring a power supply voltage between the power supply interface and the ground over the load,
   determining a charging capability of the power supply interface on the basis of the measured power supply voltage,
   detecting a placement of a power receiver device on the charging area of the wireless charging transmitter, and
   in response to the detecting the placement of the power receiver device, transmitting a message indicative of the charging capability via a wireless communication interface.

2. The method according to claim 1, wherein the method further comprises indicating the determined charging capability.

3. The method according to claim 1, wherein the method further comprises transmitting energy inductively to the power receiver on the charging area of the wireless charging transmitter based on the charging capability being determined to be an active charging capability.

4. The method according to claim 1, wherein the received voltage is +5V.

5. The method according to claim 1, wherein the load is resistive and a resistance of the load is 5Ω.

6. The method according to claim 1, wherein the duration is 30 ms.

7. The method according to claim 1, wherein the power supply interface comprises a voltage bus (VBUS) of a universal serial bus (USB) interface.

8. The method according to claim 1, wherein measuring the power supply voltage is done prior to power transmission.

9. An apparatus comprising at least a wireless charging coil for transmitting inductive energy by inductive coupling, a power supply testing circuit for detecting a charging capability of a power supply interface, a controller circuit, a power transmitting circuit for transmitting power to the wireless charging coil, and a charging area, wherein the power supply testing circuit is configured to:
   receive voltage at the power supply interface,
   provide a load between the power supply interface and a ground for a duration,
   measure a power supply voltage between the power supply interface and the ground over the load,
   determine the charging capability of the power supply interface on the basis of the measured power supply voltage,
   detect a placement of a power receiver device on the charging area, and
   in response to the detecting the placement of the power receiver device, transmit a message indicative of the charging capability via a wireless communication interface.

10. The apparatus according to claim 9, wherein the apparatus is further configured to indicate the determined charging capability.

11. The apparatus according to claim 9, wherein the controller circuit is configured to activate the power transmitting circuit for transmitting power to the wireless charging coil based on the charging capability being determined to be an active charging capability and based on the power receiver being on the charging area.

12. The apparatus according to claim 9, wherein the received voltage is +5V.

13. The apparatus according to claim 9, wherein the load is resistive and a resistance of the load is 5Ω.

14. The apparatus according to claim 9, wherein the duration is 30 ms.

15. The apparatus according to claim 9, wherein the power supply interface comprises a voltage bus (VBUS) of a universal serial bus (USB) interface.

16. The apparatus according to claim 9, wherein the power supply testing circuit is configured to measure the power supply voltage prior to power transmission.

17. A computer program product embodied on a non-transitory computer readable medium, comprising computer program code configured to, when executed on at least one processor, cause an apparatus to:
- receive voltage at a power supply interface of a wireless charging transmitter comprising a charging area,
- provide a load between the power supply interface and ground for a duration by a power supply testing circuit of the wireless charging transmitter,
- measure a power supply voltage between the power supply interface and the ground over the load,
- determine a charging capability of the power supply interface on the basis of the measured power supply voltage,
- detect a placement of a power receiver device on the charging area of the wireless charging transmitter, and
- in response to the detecting the placement of the power receiver device, transmit a message indicative of the charging capability via a wireless communication interface.

18. The computer program product according to claim 17, wherein the computer program code further is configured to, when executed on at least one processor, cause an apparatus to:
- transmit energy inductively to the power receiver on the charging area of the wireless charging transmitter based on the charging capability being determined to be an active charging capability.

* * * * *